(12) United States Patent
Siegel et al.

(10) Patent No.: US 12,146,533 B2
(45) Date of Patent: Nov. 19, 2024

(54) CLUTCH ASSEMBLY AND ROTATING SYSTEM INCLUDING THE SAME

(71) Applicant: BorgWarner Inc., Auburn Hills, MI (US)

(72) Inventors: Benjamin A. Siegel, Chicago, IL (US); Steven J. Kowal, Naperville, IL (US); David T. Vierk, Mokena, IL (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/497,651

(22) Filed: Oct. 30, 2023

(65) Prior Publication Data

US 2024/0151276 A1     May 9, 2024

Related U.S. Application Data

(60) Provisional application No. 63/422,528, filed on Nov. 4, 2022.

(51) Int. Cl.
| | | |
|---|---|---|
| *F16D 25/10* | (2006.01) | |
| *F16D 13/52* | (2006.01) | |
| *F16D 48/06* | (2006.01) | |

(52) U.S. Cl.
CPC ............. *F16D 25/10* (2013.01); *F16D 13/52* (2013.01); *F16D 48/062* (2013.01); *F16D 2500/1045* (2013.01); *F16D 2500/30406* (2013.01); *F16D 2500/30421* (2013.01)

(58) Field of Classification Search
CPC ........ F16D 25/10; F16D 13/52; F16D 48/062; F16D 7/027; F16D 2500/1045; F16D 2500/30406; F16D 2500/30421; F16D 13/12; F16D 1/0835; F16D 7/022

See application file for complete search history.

(56) References Cited

U.S. PATENT DOCUMENTS

| | | | | |
|---|---|---|---|---|
| 4,271,948 A | * | 6/1981 | Yew ......................... | F01P 7/088 |
| | | | | 192/72 |
| 7,066,305 B2 | * | 6/2006 | Grzesiak ................ | F16D 65/065 |
| | | | | 188/347 |
| 2019/0061521 A1 | * | 2/2019 | Guo ....................... | B60K 17/356 |

* cited by examiner

*Primary Examiner* — Jacob S. Scott
*Assistant Examiner* — Farhana Pervin
(74) *Attorney, Agent, or Firm* — Howard & Howard Attorneys PLLC

(57) ABSTRACT

A clutch assembly includes a first shaft extending along and rotatable about a first shaft axis, and a second shaft extending along and rotatable about a second shaft axis that is parallel with the first shaft axis. The clutch assembly also includes a first friction component coupled to and rotatable with the first shaft, and a second friction component coupled to and rotatable with the second shaft. The clutch assembly additionally includes a band clutch assembly. The band clutch assembly includes a retaining band disposed about the first and second friction components, and a retaining component coupled to the retaining band. The retaining band is engageable with the first and second friction components, and the retaining band and the retaining component are rotatable with the first and second shafts during rotation of the first and second shafts.

20 Claims, 4 Drawing Sheets

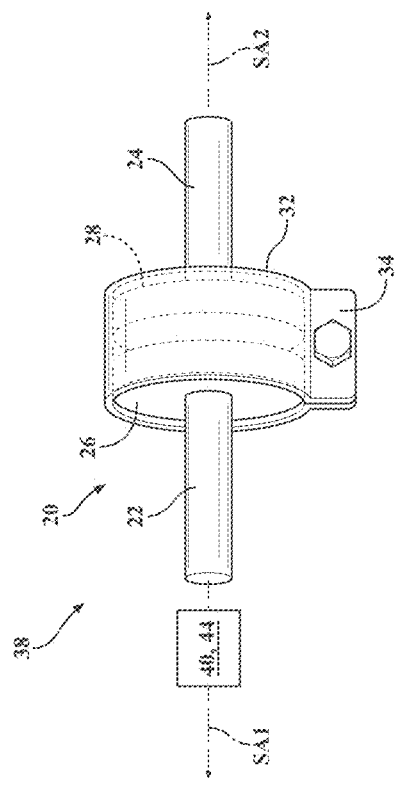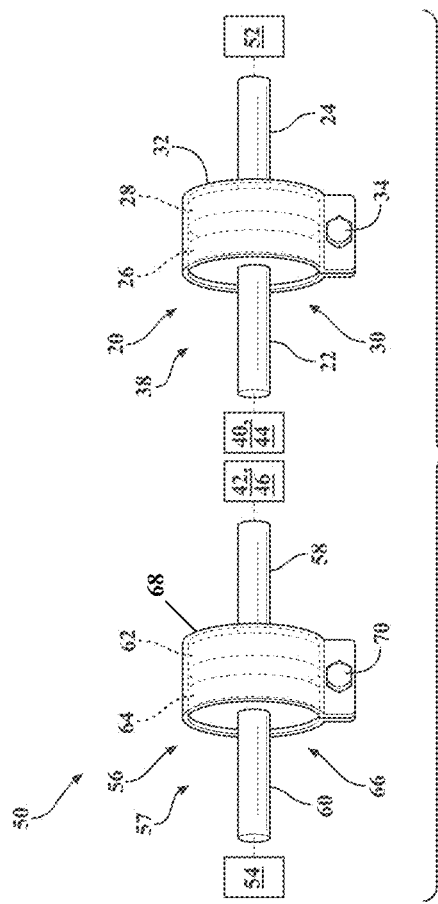

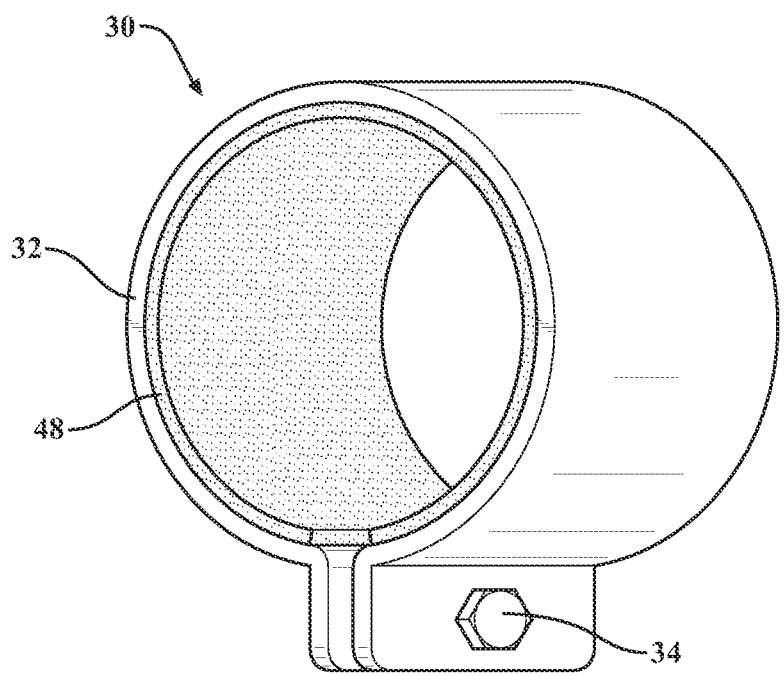
FIG. 5
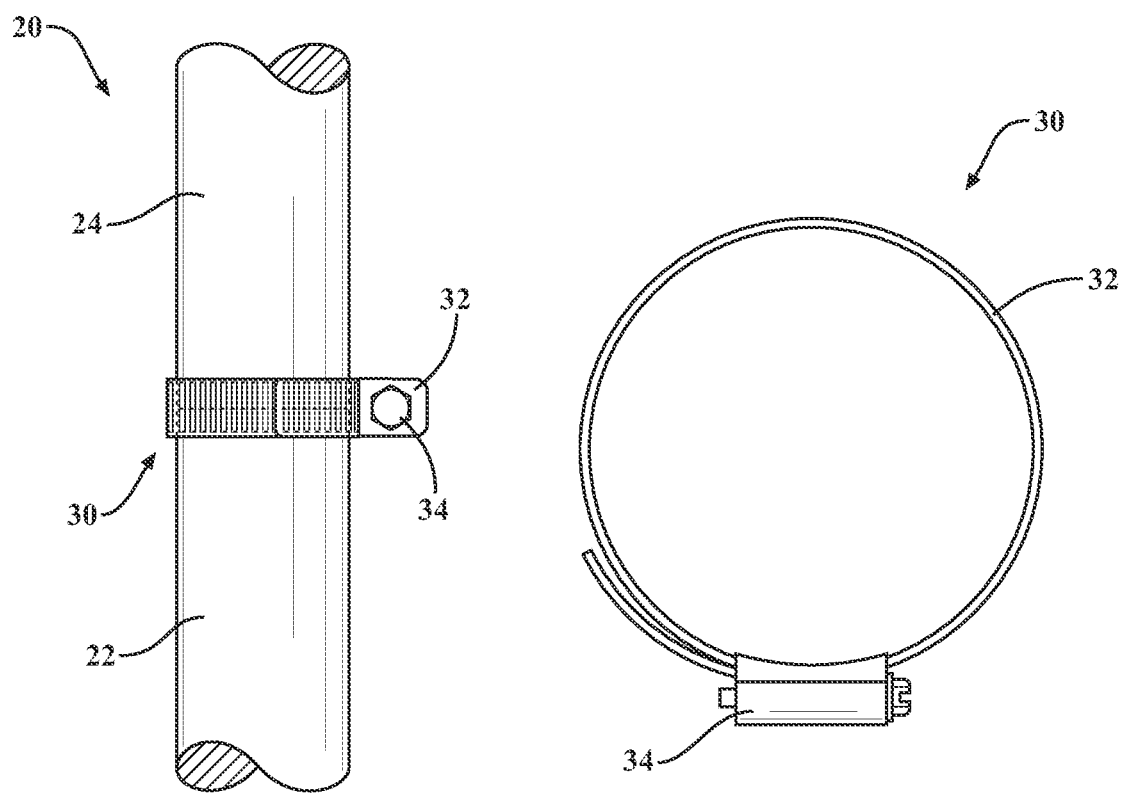
FIG. 6
FIG. 7

CLUTCH ASSEMBLY AND ROTATING SYSTEM INCLUDING THE SAME

CROSS-REFERENCE TO RELATED APPLICATIONS

The subject patent application claims priority to and all the benefits of U.S. Provisional Patent Application No. 63/422,528 filed on Nov. 4, 2022, which is herein incorporated by reference in its entirety.

BACKGROUND OF THE INVENTION

1. Field of the Invention

The invention relates generally to a clutch assembly and, more specifically, to a clutch assembly for use in a rotating system.

2. Description of Related Art

Typical clutch assemblies are used to transfer torque from a first rotating component, such as a first shaft receiving rotational torque from a first torque component, to a second rotating component, such as a second shaft. Typical clutch assemblies selectively rotatable engage and disengage the first and second rotating components to selectively transfer rotational torque from the first shaft to the second shaft, which, in turn, transfers rotational torque to at least one wheel of a vehicle. In recent years, electric vehicles have included electric motors that are able to deliver higher rotational torque than in previous years. In view of this, clutch assemblies have been designed to be stronger, which often results in a more expensive and bulkier clutch assembly to protect the clutch assembly from torque spikes.

Accordingly, there remains a need for an improved clutch assembly.

SUMMARY OF THE INVENTION

A clutch assembly includes a first shaft extending along and rotatable about a first shaft axis, and a second shaft extending along and rotatable about a second shaft axis that is parallel with the first shaft axis. The clutch assembly also includes a first friction component coupled to and rotatable with the first shaft, and a second friction component coupled to and rotatable with the second shaft. The clutch assembly additionally includes a band clutch assembly. The band clutch assembly includes a retaining band disposed about the first and second friction components, and a retaining component coupled to the retaining band. The retaining band is engageable with the first and second friction components, and the retaining band and the retaining component are rotatable with the first and second shafts during rotation of the first and second shafts.

BRIEF DESCRIPTION OF THE DRAWINGS

Other advantages of the present disclosure will be readily appreciated, as the same becomes better understood by reference to the following detailed description when considered in connection with the accompanying drawings.

FIG. 1 is a perspective view of a clutch assembly and a rotating assembly including the same.

FIG. 2 is a perspective view of a vehicle including two rotating assemblies.

FIG. 5 is a front view of the band clutch assembly.

FIG. 6 is a top view of the clutch assembly.

FIG. 7 is a side view of the band clutch assembly.

DETAILED DESCRIPTION OF THE INVENTION

Figure 3:
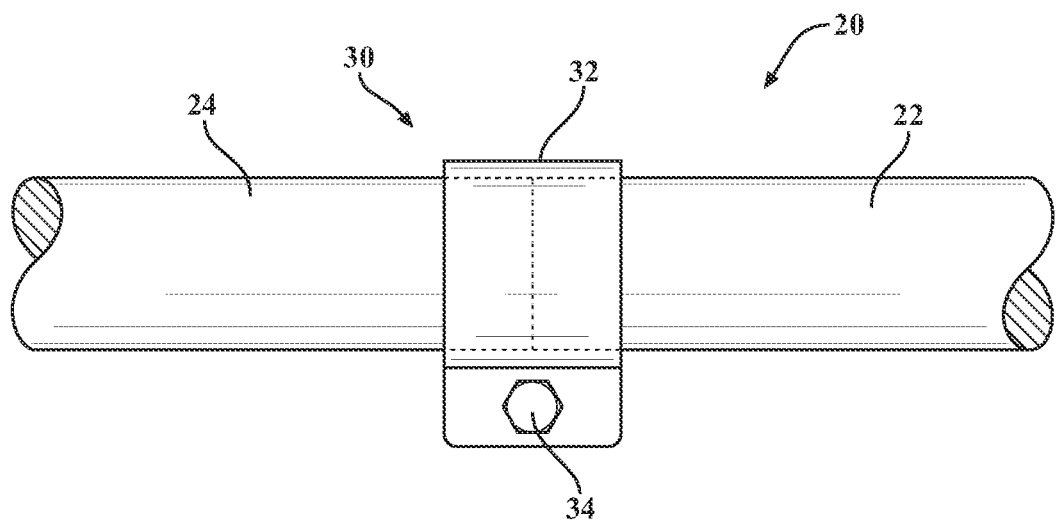
FIG. 3 is a partial cross-section view of the clutch assembly.

With reference to the Figures, wherein like numerals indicate like parts throughout the several views, a clutch assembly 20 is generally shown in FIG. 1. The clutch assembly 20 includes a first shaft 22 extending along and rotatable about a first shaft axis SA1, and a second shaft 24 extending along and rotatable about a second shaft axis SA2 that is parallel with the first shaft axis SA1. The first shaft axis SA1 may be coaxial with the second shaft axis SA2. The clutch assembly 20 typically includes a first friction component 26 coupled to and rotatable with the first shaft 22, and a second friction component 28 coupled to and rotatable with the second shaft 24. The first friction component 26 may be integral with the first shaft 22 (i.e., one piece) or may be a separate component that is secured to the first shaft 22. Similarly, the second friction component 28 may be integral with the second shaft 24 (i.e., one piece) or may be a separate component that is secured to the second shaft 24. It is also to be appreciated that the clutch assembly 20 may only include the first friction component 26 and that the second shaft 24 may be rigidly coupled to the retaining band 32, such as through a splined connection, welded connection, or any other suitable rigid connection, as described in further detail below. In such embodiments, only the first shaft 22 is configured to slip with respect to the retaining band 32 when a predetermined amount of torque is exceeded.

The clutch assembly 20 further includes a band clutch assembly 30 including a retaining band 32 disposed about the first and second friction components 26, 28 and a retaining component 34 coupled to the retaining band 32. The retaining band 32 is engageable with the first and second friction components 26, 28, and the retaining band 32 and the retaining component 34 are rotatable with the first and second shafts 22, 24 during rotation of the first and second shafts 22, 24. Typically, an inner surface 75 of the retaining band 32 has a friction material 76 disposed on the inner surface. The friction material 76 may be integral with the retaining band 32 such that the inner surface 75 may have bumps, grooves, indentations, projections, and the like. Alternatively, the friction material 76 may be a separate material from the retaining band 32 that is bonded to the inner surface 75 of the retaining band 32. It is to be appreciated that the clutch assembly 20 may be a wet clutch assembly (i.e., include lubrication within the clutch assembly) or may be a dry clutch assembly (i.e., no lubrication within the clutch assembly). The first and second friction components 26, 28 may be configured as a disc, drum, or any other suitable configuration for allowing the retaining band 32 to contact the first and second friction components 26, 28. Again, it is to be appreciated that in some embodiments the clutch assembly 20 may include the first friction component 26 and not the second friction component 28 and, in such embodiments, the second shaft 24 may be rigidly coupled to the retaining band 32, such as through a splined, welded, or other suitable rigid connection, such that only the first shaft 22 is able to slip with respect to the retaining band 32.

As described in further detail below, the clutch assembly 20 provides several advantages. First, the clutch assembly 20 having the retaining band 32 being engageable with the first and second friction components 26, 28, and the retaining band 32 and the retaining component 34 being rotatable with the first and second shafts 22, 24 during rotation of the first and second shafts 22, 24 allows the clutch assembly 20 to occupy smaller space than other clutch assemblies, such as spring loaded clutches. Similarly, in embodiments where the clutch assembly 20 has the retaining band 32 being engageable with the first friction component 26 and the second shaft 24 being rigidly coupled to the retaining band 32, having the retaining band 32 and the retaining component 34 being rotatable with the first and second shafts 22, 24 during rotation of the first and second shafts 22, 24 allows the clutch assembly 20 to occupy smaller space than other clutch assemblies, such as spring loaded clutches. Second, the clutch assembly 20 having the band clutch assembly 30 allows for a large holding capacity due to the area of contact between the retaining band 32 and the first and friction component 26, and, when present, the second friction component. More specifically, when calculating the coefficient of friction between the retaining band 32 and the first friction component 26 and optionally the second friction component 28, the coefficient is in the exponent for retaining band 32, so there is very high capacity with small packaging. Third, as described in further detail below, the band clutch assembly 30 allows at least the first shaft 22 to selectively slip when a predetermined torque provided to the first shaft 22 exceeds a predetermined torque threshold. In other words, by allowing the first shaft 22 to selectively slip when a predetermined torque provided to the first shaft 22 exceeds a predetermined torque threshold, the clutch assembly 20 acts as a torque interruption device. Torque interruption devices may be referred to as a mechanical fuse. Then, when the torque drops below the predetermined torque threshold, the retaining band 32 regains rotatable connection (i.e., rotating in unison) with the shaft that previously slipped (i.e., the first shaft 22) such that the first and second shafts 22, 24 rotate in unison about the first and second shaft axis SA1, SA2. During rotation of the first and second shafts 22, 24 in unison with the clutch assembly 20, the retaining band 32 is typically in continuous engagement with the first and second friction components 26, 28, both during slipping of the first and/or second shaft 22, 24.

In one embodiment, the clutch assembly 20 may be included in a rotating system 38 including a first torque component 40 coupled to the first shaft 22 for providing rotational torque to the first shaft 22. The first torque component 40 may be further defined as a first electric motor 44. The first shaft 22 may be a male member of the electric motor 44 or otherwise may be coupled to the male member of the electric motor 44. In such embodiments, the first electric motor 44 is configured to provide rotational torque to the first shaft 22 and, in turn, the second shaft 24 through the band clutch assembly 30. The first electric motor 44 may also receive rotational torque from the first shaft 22 through torque provided from the second shaft 24 through the band clutch assembly 30 such that the first electric motor 44 also function as a generator. In a non-limiting example, the rotating system 38 may be further defined as a battery electric vehicle powertrain. The rotating system 38 may be used in other applications, such as transfer cases, wind turbines, and any other suitable system that has a first shaft (input shaft) and a second shaft (output shaft) couple together by a band clutch assembly.

The retaining band 32 has an inner band surface 48 facing the first friction component 26 and, when present, the second friction component 28, as shown in FIG. 5. The inner band surface 48 has a band coefficient of friction, the first friction component 26 has a first coefficient of friction, and the second friction component 28 has a second coefficient of friction. When the first shaft 22 and the second shaft 24 are rotating, the first shaft 22 may rotate faster than the second shaft 24 when a static coefficient of friction between the first friction component 26 and the inner band surface 48 is overcome due to a torque spike provided from the first torque component 40. Then, when the torque decreases from the first torque component 40, the retaining band 32 reengages the first friction component 26 such that the first shaft 22, band clutch assembly 30, and the second shaft 24 rotate in unison about the first and second shaft axis SA1, SA2.

Typically, the retaining band 32 defines a band diameter BD, with the band diameter BD being constant during operation of the clutch assembly 20. Based on various parameters desired by the clutch assembly 20, the retaining band 32 is tightened around the first and second friction components 26, 28 to a desired tightness to achieve a desired torque capacity between the first and second friction components 26, 28 and the retaining band 32. The retaining component 34, such as a retaining clamp or retaining screw, is used to tighten and hold the retaining band 32 into engagement with the first friction component 26 and, when present, the second friction component 28. When the retaining band 32 is held into engagement with the first and second friction components 26, 28, the clutch assembly 20 does not require an actuating device (i.e., the clutch assembly 20 is free of an actuating device for actuating the retaining band 32) to engage and disengage the retaining band 32 from the first and second friction components 26, 28 because the clutch assembly 20 is able to regulate torque passively rather than actively actuating the clutch assembly 20. Depending on the application of the clutch assembly 20 in the rotating system 38, such as in a battery electric vehicle powertrain, the coefficient of friction, such as through material and/or coating selection, lubricant selection if the band clutch assembly 30 is a wet clutch assembly, etc., tightness of the retaining band 32, size of the retaining band 32, etc. may be adjusted to achieve the desired torque capacity and determine when torque interruption occurs.

Figure 4:
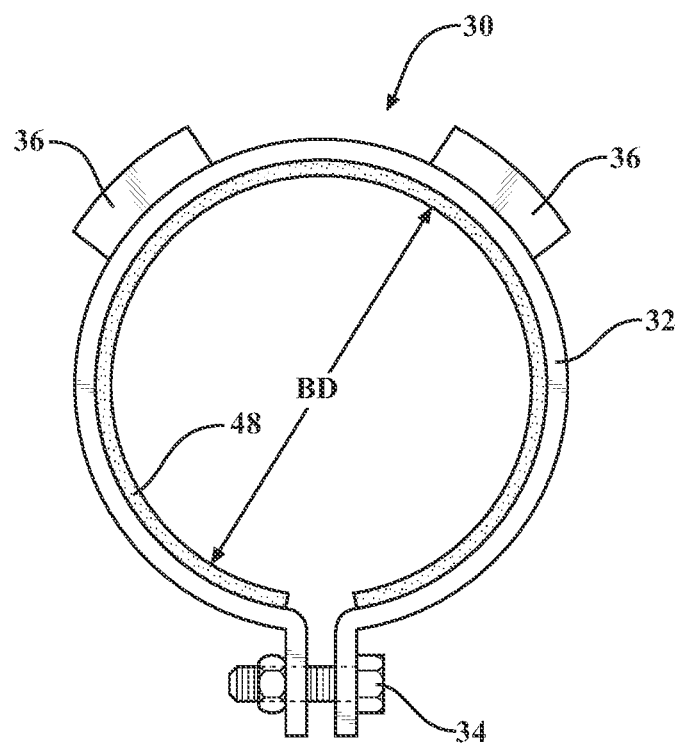
FIG. 4 is a front view of a band clutch assembly of the clutch assembly.
Figure 8:
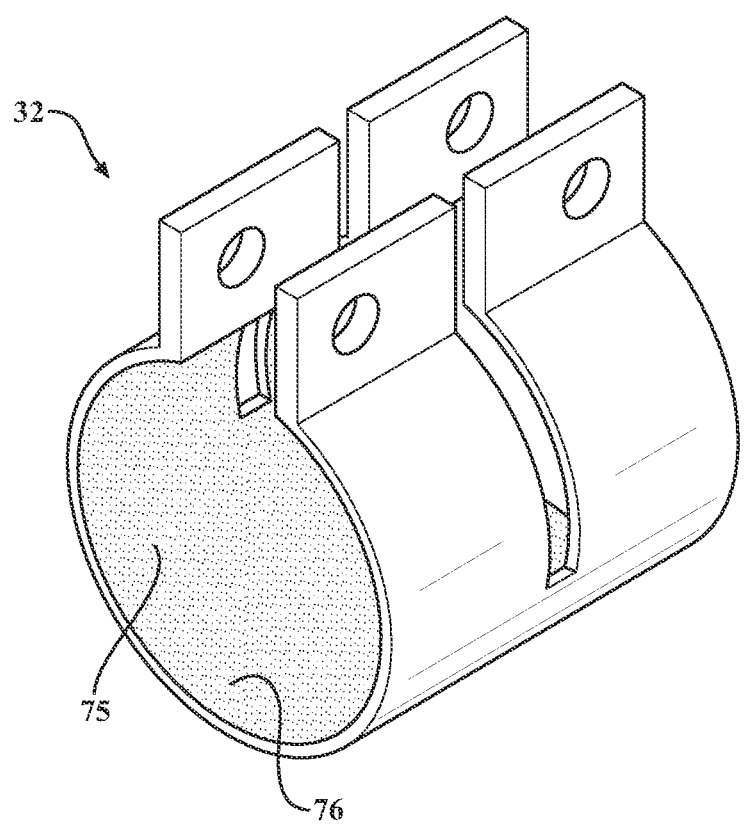
FIG. 8 is a perspective view of one embodiment of the band clutch assembly.
Figure 9:
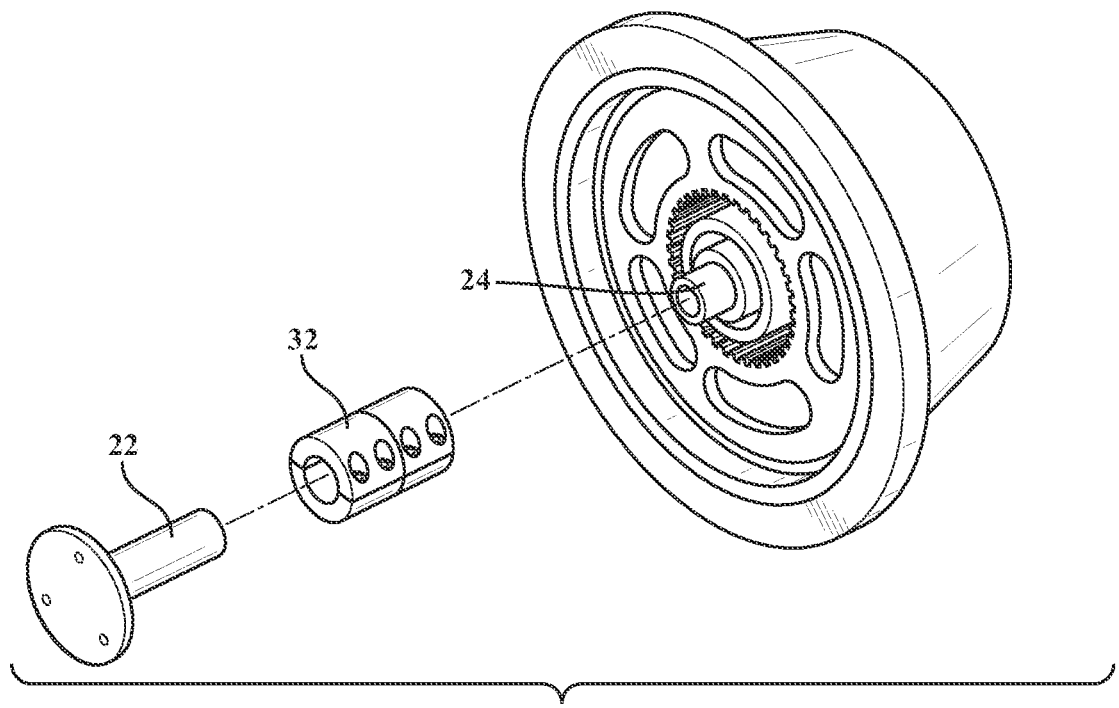
FIG. 9 is an exploded view of one embodiment of the clutch assembly.

As shown in FIG. 4, the clutch assembly 20 may include at least one balancing mass 36 coupled to the retaining band 32. It is to be appreciated that any number of balancing masses may be included as needed, such as two, three, four, etc. balancing masses. The balancing mass 36 is coupled to the retaining band 32 to help balance the mass of the clutch assembly 20 when the first shaft 22, second shaft 24, and band clutch assembly 30 are rotating about the first and second axis SA1, SA2.

The rotating system 38 may be used in a vehicle 50. In such embodiments, as shown in FIG. 2, the vehicle 50 may include an assembly 74 including two rotating systems such that the rotating system 38 provides rotational torque to a first wheel 52 of the vehicle 50, and a second rotating system 56 provides rotational torque to a second wheel 54 of the vehicle 50. Also, in such embodiments, the second rotating system 56 may include a second torque component 42, such as a second electric motor 46, for providing rotational torque to the second wheel 54. It is to be appreciated that the description above with respect to the clutch assembly 20 and rotating system 38 including the first torque component 40 equally applies to the second rotating system 56.

Specifically, the second rotating system 56 may include a second clutch assembly 57 including a first shaft 58 and a second shaft 60 that are rotatable coaxial to one another. The second clutch assembly 57 also includes a first friction component 62 coupled to and rotatable with the first shaft 58 of the second clutch assembly 57, and a second friction component 64 coupled to and rotatable with the second shaft 60 of the second clutch assembly 57. The second clutch assembly 57 additionally includes a second band clutch assembly 66. The second band clutch assembly 66 includes a second retaining band 68 disposed about the first and second friction components 62, 64 of the second clutch assembly 57, and a second retaining component 70 coupled to the second retaining band 68. The second retaining band 68 is engageable with the first and second friction components 62, 64 of the second clutch assembly 57, and the second retaining band 68 and the second retaining component 70 are rotatable with the first and second shafts 58, 60 of the second clutch assembly 57 during rotation of the first and second shafts 58, 60 of the second clutch assembly 57. It is to be appreciated that the description above with respect to the clutch assembly 20 and rotating system 38 including the first torque component 40 equally applies to the second clutch assembly 57 and the second rotating system 56 including the second torque component 42.

A method of operating the rotating system 38 includes the steps of determining a predetermined amount of torque to transfer from the first torque component 40 to the first shaft 22 and calculating a coefficient of friction between the first friction component 26 and the retaining band 32 that is needed to allow the first friction component 26 to slip with respect to the retaining band 32 when the predetermined amount of torque is exceeded.

The invention has been described in an illustrative manner, and it is to be appreciated that the terminology which has been used is intended to be in the nature of words of description rather than limitation. Many modifications and variations of the present invention are possible in light of the above teachings, and the invention may be practiced otherwise than as specifically described.

What is claimed is:
1. A clutch assembly comprising:
   a first shaft extending along and rotatable about a first shaft axis;
   a second shaft extending along and rotatable about a second shaft axis that is parallel with said first shaft axis;
   a first friction component coupled to and rotatable with said first shaft;
   a second friction component coupled to and rotatable with said second shaft; and
   a band clutch assembly comprising a retaining band disposed about said first and second friction components, and a retaining component coupled to said retaining band;
   wherein said retaining band is engageable with said first and second friction components, and wherein said retaining band and said retaining component are rotatable with said first and second shafts during rotation of said first and second shafts.
2. The clutch assembly as set forth in claim 1 further defined as a wet clutch assembly.
3. The clutch assembly as set forth in claim 1 further defined as a dry clutch assembly.
4. The clutch assembly as set forth in claim 1, wherein said retaining band defines a band diameter, and wherein said band diameter is constant during operation of the clutch assembly.
5. The clutch assembly as set forth in claim 1, wherein said retaining band is continuously engaged with said first and second friction components during operation of the clutch assembly.
6. The clutch assembly as set forth in claim 1, wherein said retaining component secures engagement of said retaining band to said first and second friction components, and wherein said retaining component maintains a constant diameter of said retaining band.
7. The clutch assembly as set forth in claim 1, wherein said retaining component is further defined as a retaining clamp.
8. The clutch assembly as set forth in claim 1, wherein said retaining component is further defined as a retaining screw.
9. The clutch assembly as set forth in claim 1 further comprising at least one balancing mass coupled to said retaining band for balancing said retaining band during rotation of said band clutch assembly.
10. The clutch assembly as set forth in claim 1, wherein said first friction component is integral with said first shaft.
11. The clutch assembly as set forth in claim 1, wherein said second friction component is integral with said second shaft.
12. The clutch assembly as set forth in claim 1, wherein said retaining band has an inner band surface facing said first and second friction components, wherein said inner band surface has a band coefficient of friction, wherein said first friction component has a first coefficient of friction, wherein said second friction component has a second coefficient of friction, and wherein, when said first shaft and said second shaft are rotating, said first shaft rotates faster than said second shaft when a static coefficient of friction between said first friction component and said inner band surface is overcome.
13. The clutch assembly as set forth in claim 1, wherein said band clutch assembly is configured as a torque interruption device.
14. A rotating system comprising said clutch assembly as set forth in claim 1 and further comprising a first torque component coupled to said first shaft for providing rotational torque to said first shaft.
15. The rotating system as set forth in claim 14 being further defined as a battery electric vehicle powertrain.
16. The rotating system as set forth in claim 14, wherein said first shaft, said second shaft, and said retaining band are selectively rotatable in unison when said retaining band is engaged with said first and second friction components and when said first torque component provides rotational torque to said first shaft.
17. An assembly comprising:
   said rotating system as set forth in claim 14;
   a second rotating system, wherein said second rotating system comprises a second clutch assembly comprising,
   a first shaft,
   a second shaft that is parallel with said first shaft of said second clutch assembly,
   a first friction component coupled to and rotatable with said first shaft of said second clutch assembly,
   a second friction component coupled to and rotatable with said second shaft of said second clutch assembly, and a second band clutch assembly comprising a second retaining band disposed about said first and second friction components of said second clutch assembly and a second retaining component coupled to said second retaining band, wherein said second retaining band of said second band clutch assembly is engageable with said first and second friction components of said second clutch assembly, and wherein said second retaining band of said second band clutch assembly and said second retaining component of said second band clutch assembly are rotatable with said first and second shafts of said second clutch assembly during rotation of said first and second shafts of said second clutch assembly; and a second torque component coupled to said first shaft of said second clutch assembly for providing rotational torque to said first shaft of said second clutch assembly.

18. The assembly as set forth in claim 17, wherein said first shaft, said second shaft, and said retaining band are selectively rotatable in unison when said retaining band is engaged with said first and second friction components and when said first torque component provides rotational torque to said first shaft; and wherein said first shaft of said second clutch assembly, said second shaft of said second clutch assembly, and said second retaining band are selectively rotatable in unison when said second retaining band is engaged with said first and second friction components of said second clutch assembly and when said second torque component provides rotational torque to said first shaft of said second clutch assembly.

19. A vehicle comprising said assembly as set forth in claim 17 and further comprising a first wheel coupled to said second shaft of said clutch assembly and a second wheel coupled to said second shaft of said second clutch assembly.

20. A method of operating the rotating assembly as set forth in claim 14, the method comprising the steps of:

determining a predetermined amount of torque to transfer from the first torque component to the first shaft; and calculating a coefficient of friction between the first friction component and the retaining band that is needed to allow the first friction component to slip with respect to the retaining band when the predetermined amount of torque is exceeded.

\* \* \* \* \*